United States Patent [19]
Boenecke

[11] 4,178,490
[45] Dec. 11, 1979

[54] TAMPERPROOF HANDSET FOR RAILROAD APPLICATIONS

[76] Inventor: Charles A. Boenecke, 1 Capshire Dr., Cherry Hill, N.J. 08003

[21] Appl. No.: 896,073

[22] Filed: Apr. 13, 1978

Related U.S. Application Data

[63] Continuation-in-part of Ser. No. 760,877, Jan. 21, 1977, Pat. No. 4,087,659.

[51] Int. Cl.² .............................................. H04M 1/03
[52] U.S. Cl. ................................. 179/178; 174/65 R; 179/103
[58] Field of Search ............... 179/178, 179, 186, 103, 179/100 R; 339/129, 130; 174/65 R; 285/158, 161, 382.2

[56] References Cited

U.S. PATENT DOCUMENTS

| 2,574,887 | 11/1951 | Pye | 179/167 X |
| 3,315,040 | 4/1967 | Brorein | 179/178 |

FOREIGN PATENT DOCUMENTS 974487   11/1964   United Kingdom ..................... 179/103

*Primary Examiner*—Thomas W. Brown
*Attorney, Agent, or Firm*—Seidel, Gonda, Goldhammer & Panitch

[57] ABSTRACT

A tamperproof handset for use in a railroad communication system. The handset has a cable provided with plural wires which electrically connect the handset with a communication control. The control is provided with a housing having a front panel. The cable extends through a passage in a male connector section having a key section, a swaged section and a slotted section. The slotted section is provided with an annular slot. A female connector section has a slotted section and a threaded section. The male key section matingly engages the female slotted section. The threaded section of the female connector is threadedly secured to the front panel within a threaded hole in the front panel. A "C" shaped retainer is frictionally secured to the male slotted section to prevent displacement of the male connector section with respect to the female connector section. A jam nut is threadedly secured to the female connector threaded section and contacts the control housing to prevent rotation of the threaded section. The cable is surrounded by a neoprene sleeve section which is deformed within the passage in the male connector section to prevent withdrawal of the sleeve section and cable from the male connector section.

2 Claims, 8 Drawing Figures

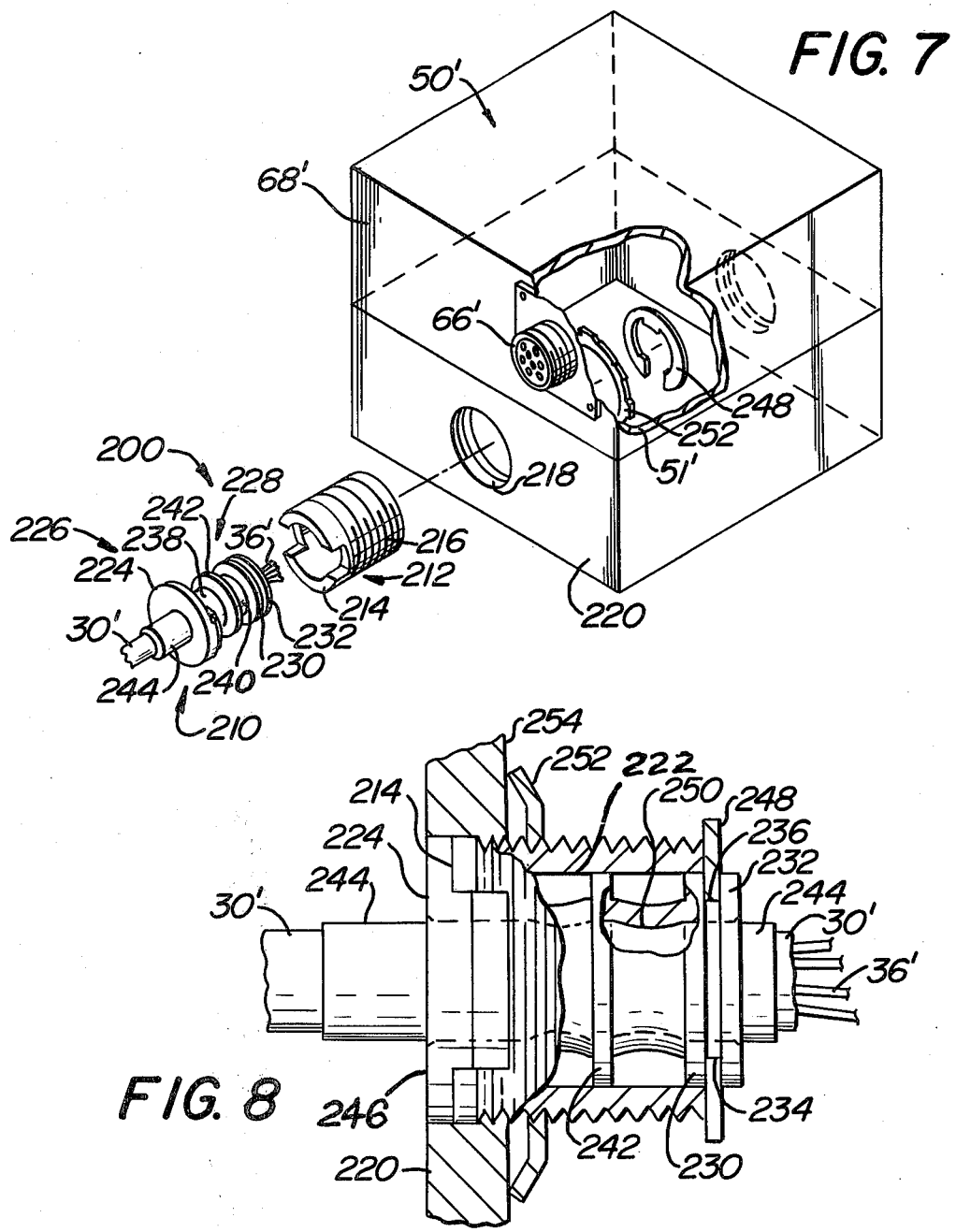

TAMPERPROOF HANDSET FOR RAILROAD APPLICATIONS

RELATED CASE

This is a continuation-in-part application based on U.S. patent application Ser. No. 760,877 filed Jan. 21, 1977 in the name of Charles A. Boenecke now U.S. Pat. No. 4,087,659.

BACKGROUND OF THE INVENTION

Communications handsets can be used with transceivers, public address systems or other communication devices located on railroad locomotives, at railroad terminals and other railway communication centers.

Handsets which have been used in railroad communication systems have utilized removable connectors to interconnect the handset to a communication control panel for a transceiver or other communication device. An example of the prior art connector is illustrated in FIG. 4 herein and will be discussed more fully hereinafter. A problem with the use of a removable interconnector is that it is removable by unauthorized persons. In recent years, railroads have sustained great losses due to the theft of communication handsets. A thief merely requires a few seconds to unscrew the connector, unplug the cable from the control panel and carry away the handset.

SUMMARY OF THE INVENTION

The tamperproof handset of the present invention includes a cable and a plurality of wires disposed within the cable for connecting the handset to a communication control. The communication control has a housing provided with a front panel. The front panel is provided with a threaded hole. The handset includes a connector having a male section and a female section. The male section has a key section, a swaged section, and a slotted section provided with an annular slot. A passage extends through the male section. The cable extends through the passage into the interior of the housing. The female section has a slotted section and a threaded section. The female threaded section is secured to the front panel within the front panel threaded hole. The male key section matingly engages the female slotted section. A retainer is disposed within the male section annular slot and is frictionally secured to the male slotted section to prevent displacement of the male connector section with respect to the female connector section. A jam nut is threadedly secured to the female threaded section and frictionally contacts the housing to prevent rotation of the female threaded section. A neoprene sleeve section surrounds the cable and is frictionally secured by deformation within the male connector passage.

An advantage of the invention is that the handset connector cannot be removed by unauthorized persons from the communication control housing by pulling or rotation.

Another advantage of the invention is that the handset cable cannot be removed by unauthorized persons from the handset connector.

Other advantages appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 7 is a view of the connector of the present invention prior to insertion in the panel of a communication control.

FIG. 8 is a view in cross-section of the connector of the present invention inserted in the panel of the communication control.

DETAILED DESCRIPTION OF THE INVENTION

Figure 1:
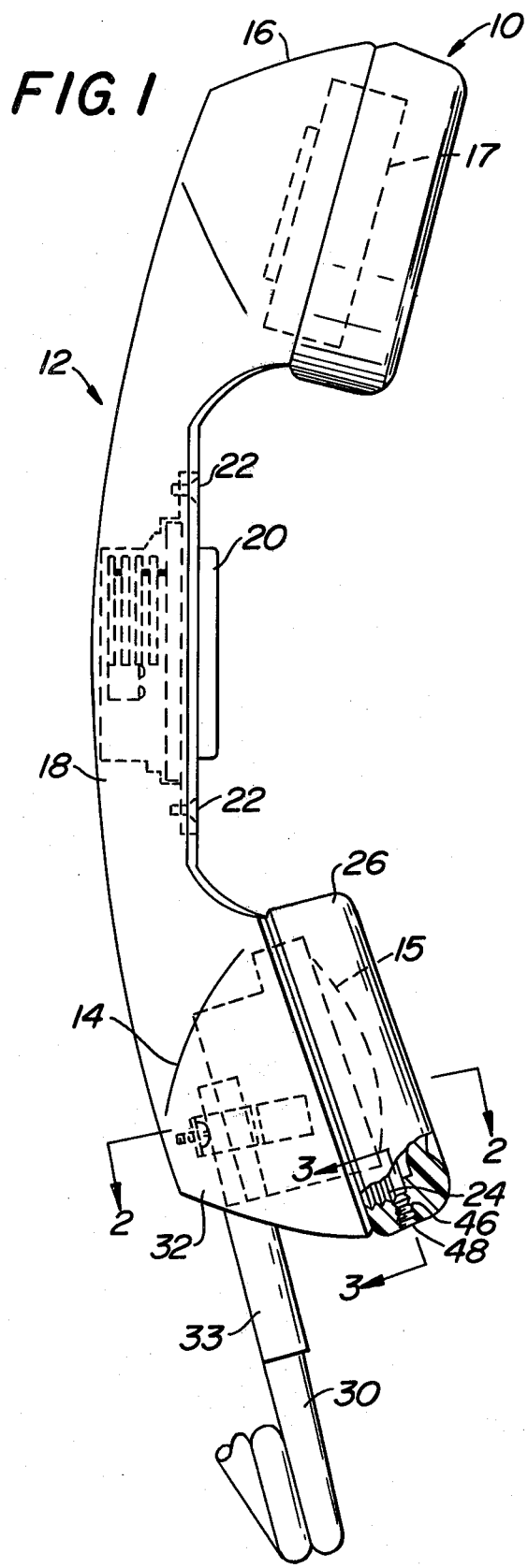
FIG. 1 is a side view, partially broken away, of a handset of the present invention.
Figure 2:
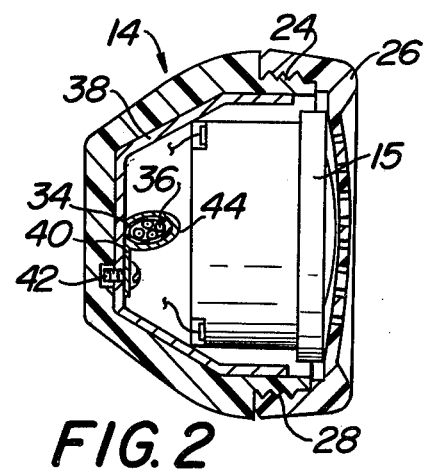
FIG. 2 is a cross-sectional view taken along line 2—2 of FIG. 1.
Figure 3:
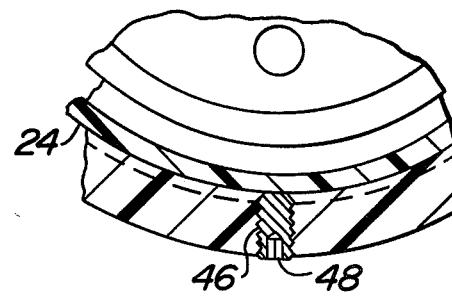
FIG. 3 is a cross-sectional view taken along line 3—3 of FIG. 1.

Referring to the drawings in detail, wherein like numerals indicate like elements, there is shown in FIG. 1 a handset designated generally as 10. The handset 10 includes a handset housing 12. The handset housing 12 has a transmitter end 14 with a receiver 15 disposed within it and a receiver end 16 with a receiver 17 disposed within it. A handle portion 18 interconnects the transmitter end 14 with the receiver end 16. A control switch or button 20 is removably attached to the handle portion 18 by a pair of screws 22.

The outer periphery of the transmitter end 14 has a threaded portion 24. A transmitter cap 26 has an internal threaded surface 28. The internal threaded surface 28 is adapted to screw onto the threaded portion 24 of the transmitter end 14. A cable 30 passes through a hole 32 in the transmitter end 14. The cable 30 has an outer covering 34 surrounding a plurality of wires 36 disposed within the cable 30. The cable 30 extends into the interior of the handset housing 12 by way of the hole 32. A sleeve 33 preferably surrounds the cable 30 in the area where the cable 30 enters the transmitter end 14. A generally U-shaped bracket 38 is fitted within the interior of the transmitter end 14. It is preferable that the U-shaped bracket 38 fit substantially flush with the interior surface of the transmitter end 14. A clamp 40 is removably secured to the bracket 38 by a screw 42. The clamp 40 includes a curved section 44 which is adapted to fit about the covering 34 of the cable 30. The curved section 44 is crimped about the cable 30 and thereby squeezes upon and frictionally holds the cable 30. The cable 30, therefore, cannot be readily pulled out of the handset housing 12 without first removing the clamp 40.

In order to remove the clamp 40, a person must first gain access to the interior of the transmitter end 14 by removing the transmitter cap 26 and the transmitter 15. The transmitter cap 26 has a threaded hole 46 extending completely therethrough. A threaded screw 48 threads into the hole 46. In order to prevent the unauthorized removal of the transmitter cap 26, the screw 48 is threaded into the hole 46 until it firmly bears upon the threaded surface 24. The transmitter cap 26 thereby cannot be rotated and unscrewed, unless the screw 48 is loosened. The screw 48 is preferably an Allen screw. Also, the screw 48 has a length such that the screw 48 is flush with or below the outer periphery of the transmitter cap 26 whenever the screw 48 has been tightened down onto the threaded portion 24. In this manner, the unauthorized removal of the clamp 40 is greatly hampered since an Allen wrench is required to remove the screw 48 before the transmitter cap 26 can be removed.

Figure 4:
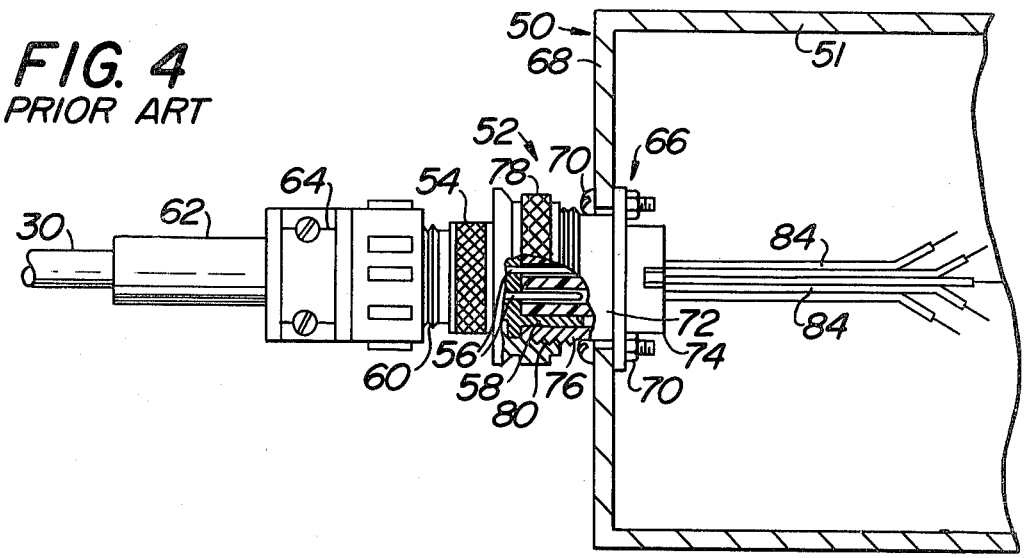
FIG. 4 is a side view, partially broken away, illustrating a connector of the prior art connecting a cable to the panel of a communication control.

In FIG. 1, one end of the cable 30 is shown connected in the handset housing 12. The other end of the cable 30 is connected to terminal strips (not shown) in a conventional communication control 50 having a housing 51. See FIG. 4. The communication control 50 may itself be electrically connected to a transceiver or other communication device (not shown). The cable 30 is typically connected to the control 50 by way of a standard well-known removable type connector 52. The removable connector 52 includes an inner cylindrical member 54, which has a plurality of male prongs 56 extending from one end thereof. The male prongs 56 are surrounded by a cylindrical flange 58. The inner cylindrical member 54 also includes a section having a threaded periphery 60. The cable 30 is received within the inner cylindrical member 54, and the wires 36 are connected to the prongs 56 in a conventional manner. A sleeve 62 surrounds the cable 30 and extends at least partially into the inner cylindrical member 54. A clamp 64 is secured about the sleeve 62 and threads onto the threaded periphery 60 in order to secure the sleeve 62 and cable 30 relative to the connector 52.

A female connector 76 is secured to a front panel 68 of the control housing 51 by means of a plurality of nuts and bolts 70. The connector 76 can be easily removed by unthreading the nuts and bolts. The female connector 66 includes an outer section 72 extending outwardly from the front panel 68 and an inner section 74 extending within the control housing 51. The outer section 72 includes a section having a threaded peripheral surface 76. The removable connector 52 includes an annular ring 78. The annular ring 78 has an inner threaded portion 80. The inner threaded portion 80 screws onto the threaded peripheral surface 76. The outer section 72 includes a plurality of female receptacles 82 for receiving the prongs 56. The female receptacles 82 are electrically connected to wires 84. The wires 84 are wired in a conventional manner to appropriate terminal strips within the control housing 51.

In order to connect a handset 10 to a control 50 by means of the conventional connector 52, the cylindrical flange 58 of the inner cylindrical member 54 is slipped into the outer section 72 of the female connector 66. The male prongs 56 thus mate with the female receptacles 82 to provide an electrical connection between the handset 12 and the control 50. The connector 52 is removably secured to the control housign 51 by tightening down the annular ring 78 onto the outer section 72 of the female connector 66. While the connector 52 provides a simple and easy method for connecting a handset 12 to a control 50, the use of such a connector 52 also facilitates the easy removal of the handset 10 by unauthorized persons.

Figure 5:
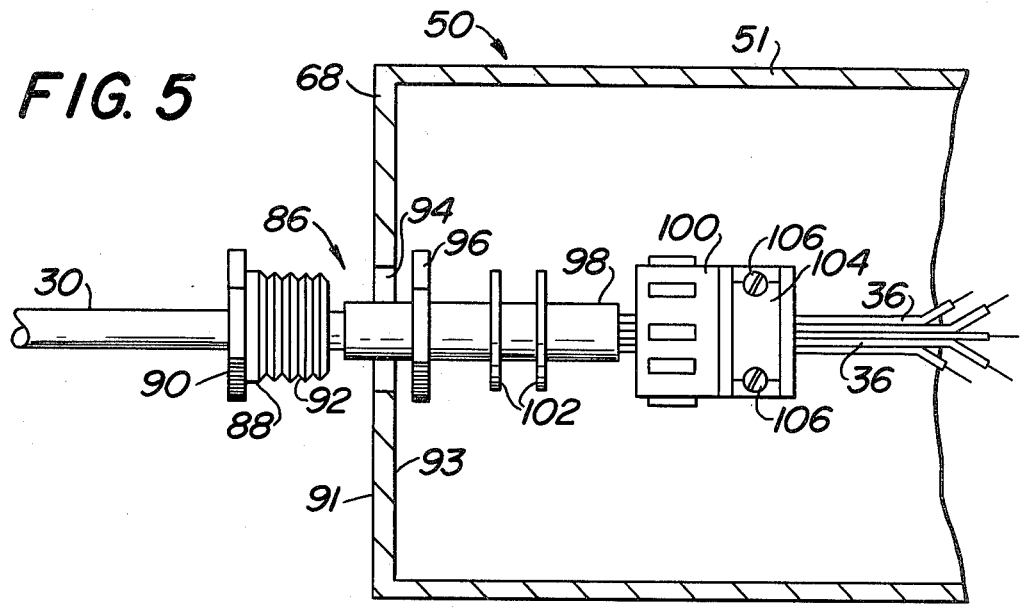
FIG. 5 is a side view of the connector of the present invention, shown with its parts exploded.
Figure 6:
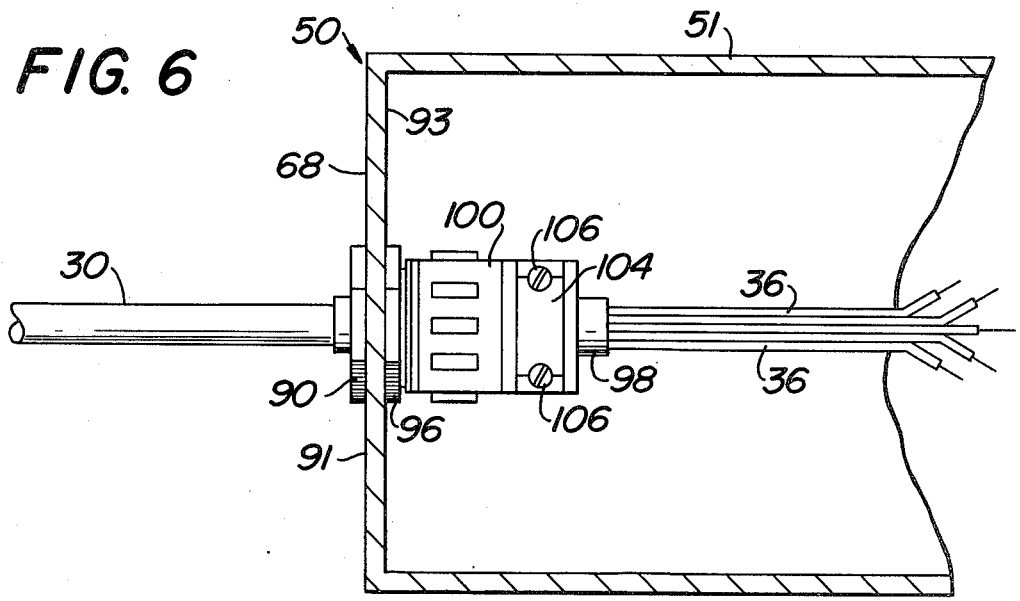
FIG. 6 is a side view of the connector of the present invention secured to the panel of a communication control.

In order to prevent the removal of the handset 10 by unauthorized persons, a connector 86 may be employed. See FIGS. 5 and 6. The connector 86 includes a bushing 88, a flange 90 and a threaded section 92. The connector 86 is installed on the housing 51 by insertion of the bushing 88 and threaded section 92 in hole 94. The flange 90 rests upon or is substantially flush with the outer surface 91 of the panel 68, and a nut 96 threads onto the threaded section 92 and tightens down upon the inner surface 93 of the panel 68. The connector 86 is thus secured to the control housing panel 68.

The cable 30 passes through a cylindrical passage (not shown) within the connector 86 and extends into the interior of the control housing 51. A sleeve 98 preferably surrounds the cable 30 in the area where the cable 30 passes through the connector 86 and in the area extending on either side of the connector. A clamp 100 having an internally threaded surface (not shown) screws onto the threaded section 92 and is thereby secured to the connector 86. Anti-friction devices such as washers 102 are preferably interposed between the clamp 100 and the nut 96.

The clamp 100 includes a clamp-down section 104, which is tightened down upon the sleeve 98 and the cable 30 by a pair of screws 106. The clamp 100 has a greater transverse dimension than the hole 94. In this manner, the clamp 100 in combination with the connector 86 fixedly secures the cable 30 in position at the control housing panel 68. The wires 36 are wired in conventional manner to appropriate terminal strips (not shown) within the control housing 51. The clamp 100 prevents the sleeve 98 and cable 30 from being withdrawn from the connector 86. The nut 96 prevents the connector 86 from being withdrawn from the housing 51. In this manner, the easy removal and theft of a handset 10 is discouraged since the cable 30 cannot be removed without first gaining access to the interior of the control.

The connector 86 and clamp 100 are suitable for use in a communication control 50 wherein the standard female connector 66 has been removed from the control housing 51. Thus, the conventional handset cannot be used should the tamperproof handset malfunction. The connector of the present invention permits the immediate use of a conventional handset as an alternate to a tamperproof handset without removal of connector 66 or other modification of the standard communication control 50.

There is shown in FIG. 7 a connector 200 according to the present invention. The connector 200 includes a male connector section 210 and a female connector section 212. The female connector section is provided with a transversely slotted section 214 and a threaded section 216. Preferably, the transversely slotted section 214 and the threaded section 216 constitute an integral unit.

The lower front panel 220 of the control housing 51' is provided with standard threaded holes 218. Thus, two standard threaded holes 218 are provided in a conventional control housing for mounting the housing in position on a threaded pipe (not shown). The pipe may depend from the railroad car structure itself. The housing is mounted, through either threaded hole, onto the pipe. The other threaded hole remains vacant. In the present invention, the female connector threaded section 216 is threadedly secured within the vacant standard threaded hole 218. See FIG. 8.

The male connector section 210 comprises a key section 224, a swaged section 226 and a slotted section 228. The slotted section 228 is provided with a pair of annular portions 230 and 232 separated by a barrel portion 234 which define an annular slot 236. Swaged section 226 is provided with a pair of swaged barrel sections 238 and 240 separated by an annular portion 242. The outer diameters of the annular portions 230, 232 and 242 are slightly less than the diameter of a cylindrical passage 222 extending through female connector section 212. Thus, the swaged section 226 and slotted section 228 slide into position through the cylindrical passage 222.

The male connector key section 224 matingly engages the female connector transversely slotted section 214. See FIG. 8. The cable 30' is surrounded by a neoprene sleeve section 244 which extends through a passage 250 within the male connector section 210. The cable wires 36' extend within the housing 50' and are connected to appropriate terminal strips (not shown) within the housing.

Preferably, the face 246 of key section 224 is substantially flush with front panel 220 or slightly recessed within the threaded hole 218 to prevent access to the male connector section 210 by an unauthorized person. A "C" shaped retainer 248 is squeezed over barrel portion 234 of slotted section 228 to lock the male connector section 210 in position with respect to the female connector section 212. The retainer 248 prevents withdrawal or displacement of the male connector section 210 with respect to the female connector section 212.

The male connector section 210 is first slipped over the neoprene sleeve section 244 which surrounds a portion of the cable 30'. The barrel portions 238 and 240 of section 226 are then swaged in conventional manner to deform the neoprene sleeve section 244 within the passage 250. As the sleeve section 244 deforms, it fills the passage 250. As a result, the sleeve section 244 is frictionally secured to the male connector section 210 with cable 30' fixed within the sleeve section and cable 30' cannot be withdrawn or pulled away from the connector section 210.

A conventional jam nut 252 is threadedly mounted on the female connector threaded section 216 and tightened against the inner surface 254 of the lower front panel 220. The jam nut 252 presses against the inner surface 254 to frictionally contact the surface 254 and prevent rotation of the female connector section 212 in position at the front panel 220. Thus, the connector 200 cannot be rotated by unauthorized persons to unthread the threaded section 216 from the hole 218.

It should be apparent that connector 200 occupies negligible space within the control housing 51'. The only portion of the connector 200 disposed within the interior of the control 50' is the female connector threaded section 216 and the male connector slotted section 228. There is no need for any relatively bulky element, such as the clamp 100 in FIG. 4, to install the connector 200. Accordingly, assembly and installation of the connector 200 on the front panel 220 can be easily and rapidly effected without obstruction by components (not shown) internal to the housing 51'.

In addition, since the conventional control housing 51' need not be altered in any way to install the connector 200, a conventional handset may be installed in the standard female connector 66' which is mounted on the conventional control housing 51'. The conventional handset may then be used as an alternate to the tamperproof handset of the present invention should the tamperproof handset malfunction.

As should be clear from the above discussion, a tamperproof handset is thus provided. At the handset end of the system, the use of the set screw 48 in conjunction with the clamp 40 prevents unauthorized access to the handset housing or its removal. At the control end of the system, the connector 200 in conjunction with the retainer 248 prevents the unauthorized removal of the cable 30'.

The present invention may be embodied in other specific forms without departing from the spirit or essential attributes thereof and, accordingly, reference should be made to the appended claims, rather than to the foregoing specification as indicating the scope of the invention.

I claim:

1. A tamperproof handset for installation in a railroad communication control having a housing provided with a front panel which has a threaded hole, said handset having a cable and a plurality of wires disposed within said cable for electrically connecting said control and handset, comprising:
   a connector having a male section and a female section;
   said female section having a slotted section and a threaded section, said female threaded section extending within the interior of said housing and being threadedly secured to said front panel within said front panel threaded hole;
   said male section having a key section, a swaged section and a slotted section provided with an annular slot, said male section having a passage extending therethrough, said male key section matingly engaging said female slotted section;
   said female section having a cylindrical passage extending therethrough for receiving said male swaged section and said male slotted section;
   a retainer disposed within said annular slot and frictionally secured to said male slotted section to prevent displacement of said male connector section with respect to said female connector section;
   a jam nut threadedly secured to said female threaded section extending within the interior of said housing, said jam nut frictionally contacting said housing to prevent rotation of said female threaded section; and
   said handset cable passing through said male connector passage into the interior of the housing.

2. A tamperproof handset according to claim 1 including a sleeve section surrounding said handset cable, said sleeve section being frictionally secured by deformation within said male connector passage.

* * * * *